May 30, 1933. G. M. BACON 1,911,872
MOTOR DELIVERY VEHICLE
Filed Aug. 1, 1929 3 Sheets-Sheet 1

INVENTOR
George M. Bacon
Whittemore Hulbert Whittemore
& Belknap ATTORNEYS

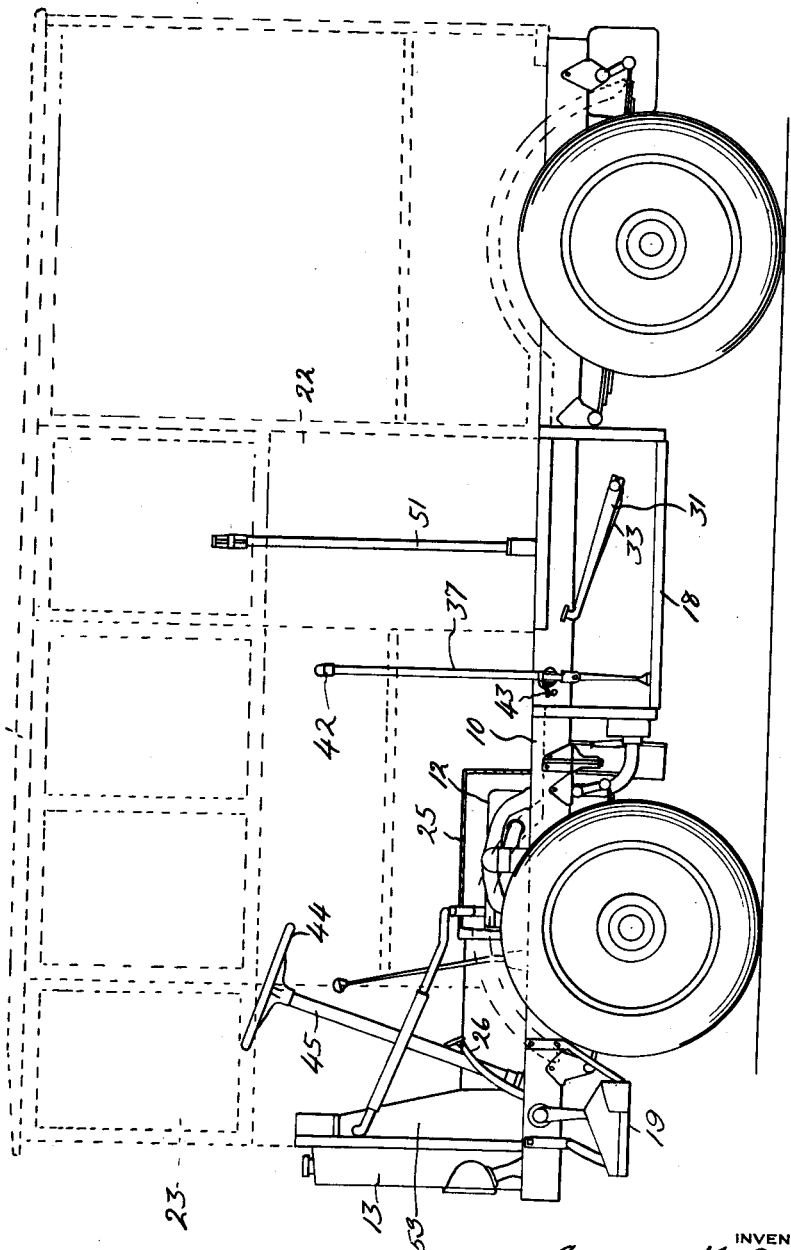

May 30, 1933.　　　G. M. BACON　　　1,911,872
MOTOR DELIVERY VEHICLE
Filed Aug. 1, 1929　　　3 Sheets-Sheet 3
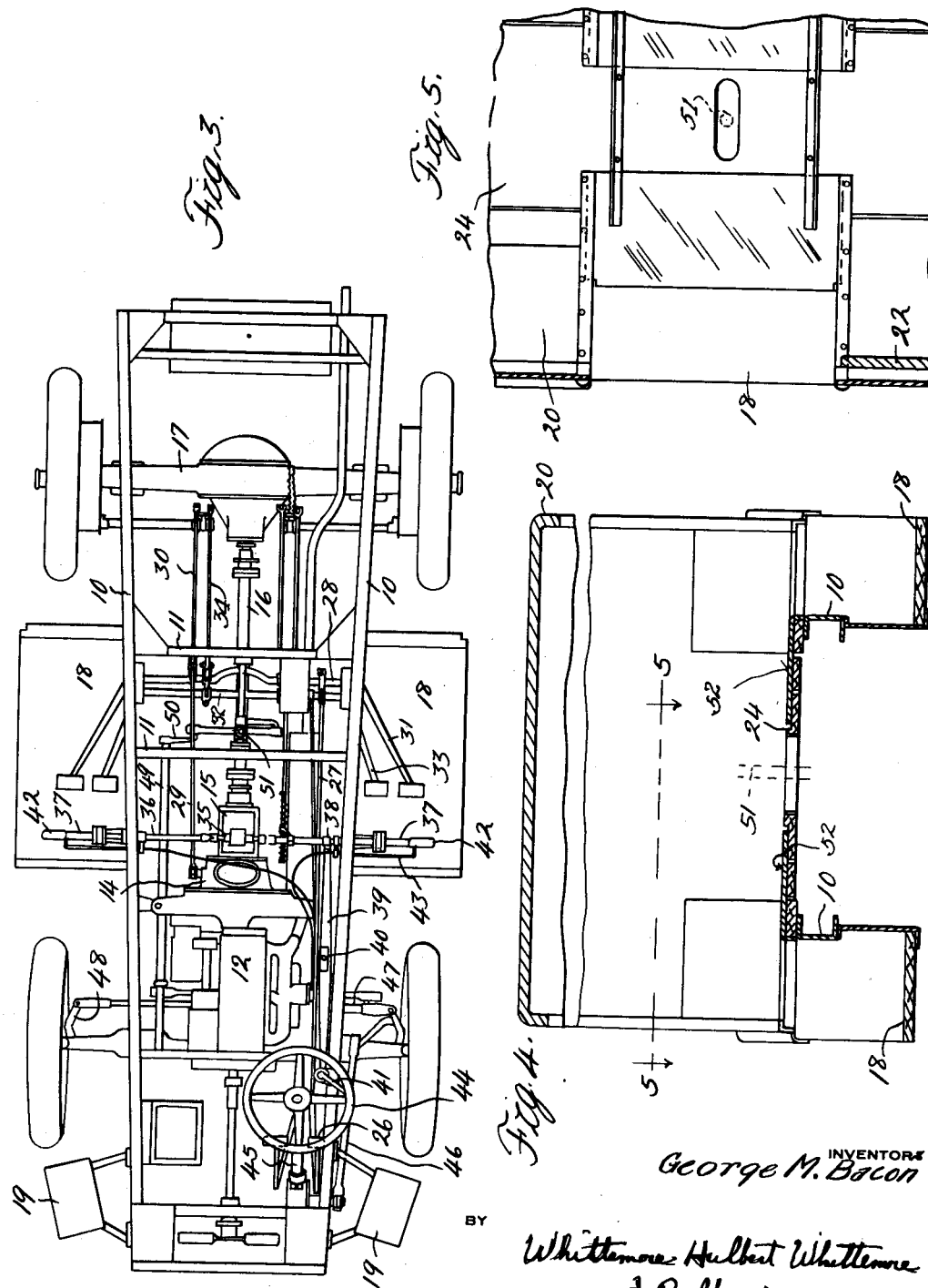

Patented May 30, 1933

1,911,872

UNITED STATES PATENT OFFICE

GEORGE M. BACON, OF DETROIT, MICHIGAN, ASSIGNOR, BY MESNE ASSIGNMENTS, TO CONTINENTAL-DIVCO COMPANY, OF DETROIT, MICHIGAN, A CORPORATION OF MICHIGAN

MOTOR DELIVERY VEHICLE

Application filed August 1, 1929. Serial No. 382,770.

This invention relates to motor vehicles and has particular reference to motor delivery vehicles adapted for house to house route deliveries.

It is the object of the present invention to obtain a construction of motor vehicle which, while conforming to standard practice in many of the details of its construction, is so modified as to avoid inconvenience hertofore encountered in using motor driven vehicles on routes where frequent stops are necessary. With this object in view, the invention consists in the various features of construction as hereafter set forth. In the drawings:

Figure 2 is a side elevation showing the chassis in full lines and the body in dotted lines.

Figure 3 is a plan view of the chassis.

Figure 4 is a sectional view taken transversely through the vehicle; and

Figure 5 is a section on the line 5—5 of Figure 4.

Figure 1:
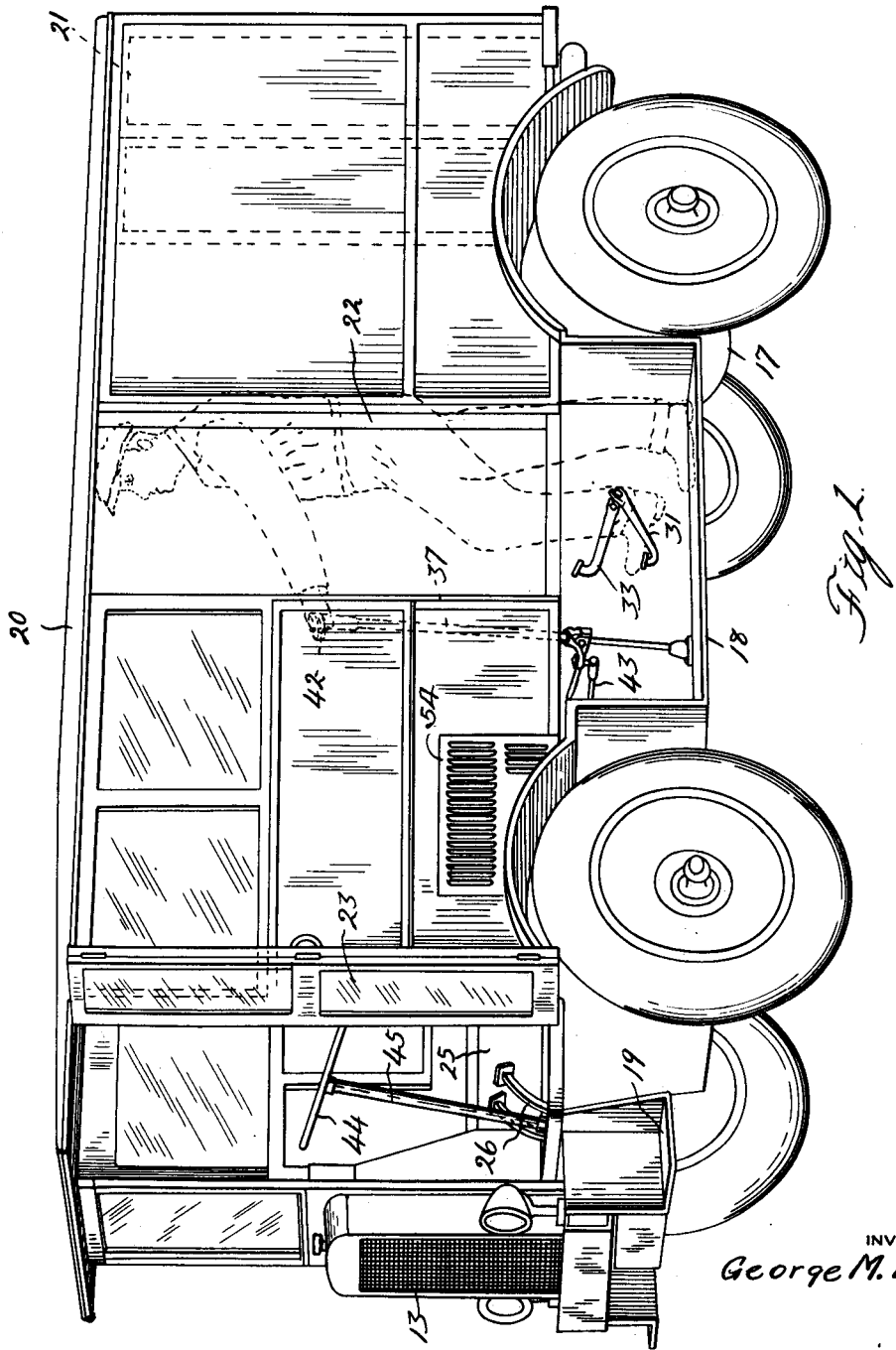
Figure 1 is a perspective view illustrating the manner of driving the vehicle from the running boards or platforms.

Generally described, my improvement comprises a chassis including an internal combustion engine with a change speed transmission, a propeller shaft and driving axle together with the usual controls therefor. The engine is preferably of the vertical multicylinder type and the transmission is preferably of the shiftable gear type. The foregoing parts are all of substantially conventional design and accordingly will not be specifically described herein. I have, however, departed from the usual arrangement of these elements on the chassis by placing the engine in rear of its usual position and separating the same from the radiator mounted at the front end of the chassis frame. An arrangement of this character permits locating the steering mechanism, motor control and brake pedals between the radiator and engine and also permits extending the vehicle body to substantially the full length of the chassis frame.

In addition to the controls which are located in front of the engine and which are operable from the driver's seat arranged above the engine, I have provided auxiliary controls which are operable from opposite sides of the chassis. The auxiliary controls consist in gear shifting, clutch and brake actuating means located above the platforms depending from opposite sides of the chassis and a steering lever which, while located centrally within the body in rear of the driver's seat, may be reached from a position upon either of the platforms. The steering lever is rockable in a transverse plane and is so connected with the steering mechanism that the vehicle will be turned in the direction in which the lever is rocked. Thus when delivery points are close together, it is not necessary for the operator to mount to the driver's seat as he may shift the car from house to house by operating it from the platforms. When, however, the vehicle is being used for wholesale deliveries wherein the stops are not close together, the steering lever may be readily detached and the space occupied thereby may be utilized for additional load, the vehicle then being steered from the controls located in front of the driver's seat. As has been stated, the body is preferably substantially the entire length of the chassis frame and is provided at its forward end on opposite sides of the radiator with door openings normally closed by suitable doors which permit of entrance and exit of the driver. In addition to the aforesaid openings, there are side doors arranged above each platform and also rear doors. The main load is carried in the compartment between the side door openings and the rear doors. The dimensions of this compartment are such as to receive a predetermined number of boxes of uniform size arranged in longitudinal, transverse and vertical series. The width of the body, however, is sufficient to accommodate at least four boxes arranged transversely of the body. The space in front of the side doors also may be used for storage purposes and has a width sufficient to accommodate at least one tier of boxes arranged three in a row in rear of the driver's seat, leaving a sufficient clearance upon opposite sides of the boxes to accommodate the transmission control levers. Moreover, the width of the body is such as to overhang the platforms, and the floor thereof opposite the side door openings and above the platforms is cut away affording the operator a standing height clearance within the boundary of the body. The arrangement is such that the side doors may be closed while the vehicle is being operated thereby affording substantially full weather protection to the operator when the side doors are in closed position.

The general arrangement as hereinbefore set forth, is such as to leave a free aisle through the center of the body for convenient access to the load both in front and in rear thereof and in reaching the steering lever from either of the platforms. It will further be noted that a large portion of the load can be reached by the operator while he is standing upon either platform, thereby facilitating the handling of the load.

In detail, as specifically shown in the drawings, the chassis is made up of a pair of side sills 10 and cross members 11 connected to the side sills in front, in rear and at intermediate points. Mounted upon the chassis adjacent the forward ends of the sill members is a vertical internal combustion engine 12 spaced a considerable distance in rear of the conventional radiator 13 which, as shown, is secured to the forward end of the chassis. Arranged in rear of the motor 12 and operatively connected thereto through the clutch within the housing 14 is a transmission 15 preferably of the slidable gear type and operatively connected to a propeller shaft 16 which in turn is connected to the rear axle 17.

Depending from opposite sides of the chassis and extending outwardly therefrom intermediate the front and rear wheels are the platforms 18. These platforms are secured in any suitable manner to the sill members 10 and are positioned at substantially curb level so as to permit the operator to readily mount the same. There are also provided steps 19 at the front of the frame at opposite sides of the radiator for assistance in mounting to the driver's seat.

The body 20 of the vehicle extends substantially the full length of the side sills 10 and is provided with doors 21 in the rear, side doors 22 above the platforms and front doors 23 on opposite sides of the radiator. As previously described, the body is of such a width as to overhand the platforms 18, and the floor 24 thereof is cut away opposite the doors 22 and above the platforms so as to permit the vehicle to be operated from a position upon the platforms while the doors 22 are closed. Thus it will be apparent that the platforms are arranged within the vehicle body so that substantially full weather protection is afforded the operator while controlling the vehicle. The upper portion of the body in front of the side doors 22 is chiefly glass, thereby affording a clear vision both from the driver's seat and from the platforms 18 from which the vehicle is also operated. The portion of the body in rear of the side doors is used solely for storage of the load and is preferably of such dimensions as to be exactly divisible by the corresponding dimensions of the separate boxes or receptacles for receiving the articles to be delivered. In the case of a milk route, for which the vehicle is especially designed, the body is of sufficient width to receive at least four boxes arranged in transverse rows. There is also space for a single transverse row of boxes in advance of the side doors but in rear of the hood 25 for the motor. Additional boxes may, if desired, be placed upon the top of this hood and at one side of the driver's seat. Thus it will be apparent that substantially all of the boxes are readily accessible from positions on the platforms 18.

Referring now in general to the controls for the vehicle, it will be noted that there is illustrated in Figure 3 a combined clutch and brake operating pedal 26 located in the space between the radiator and the driver's seat and operatively connected by means of a rod 27 to a rock shaft 28 which in turn is connected to the clutch by means of a rod 29. The rock shaft 28 is also connected to the brakes of the vehicle by means of the rods 30. As is customary when a single pedal is utilized for actuating both the clutch and the brake, sufficient lost motion is provided in the latter so that upon an initial movement of the pedal 26 the clutch will be actuated and on a further movement thereof, the brakes will be applied. The rock shaft 28 extends transversely of the vehicle and is connected at the opposite ends thereof with the pedals 31 which also operate to apply the brakes and actuate the clutch in substantially the same manner as the pedal 26. Extending across the frame in juxtaposition to the rock shaft 28 is a second rock shaft 32 having its opposite ends connected to the pedals 33. The rock shaft 32 is connected through the rods 34 to a second set of rear wheel brakes (not shown). Both sets of pedals 31 and 33 are arranged in a convenient position above the platforms 18 so as to be operated by the driver while he is in a standing position on the platforms.

The transmission 15, which is preferably of the shiftable gear type, is controlled by a rockable and shiftable gear shifter 35 such as used with the conventional H-plan type of control. The opposite ends of the shifter 35 are universally coupled with links 36 which in turn are connected to the levers 37. Each of these levers is mounted in such a manner as to permit both of the rocking and the longitudinal sliding of the shifter 35 by either of the levers 37. One of the links 36 is also provided with a rock arm 38 connected to a link 39 pivotally and slidably fulcrumed at 40 to the frame and having its opposite end connected with a universally rockable control lever 41. Thus the shifting of the gears may be effected either from the driver's seat through the lever 41 or from either of the platforms through the levers 37 positioned above the same. Rotatively mounted upon the upper end of these levers are the handle portions 42 which, as shown, are connected through suitable linkage 43 to the carburetor of the vehicle (not shown). With this arrangement, it will be apparent that the levers 37 in addition to effecting the gear shifting of the transmission also are instrumental in governing the speed of the motor.

The steering of the vehicle may also be effected either from the position on the driver's seat or from either of the platforms. As shown, a steering wheel 44 is connected to a steering post 45 adjacent the driver's seat. The steering post 45 is connected through suitable gearing to a shaft 46 which in turn is connected to a rod 47 extending between and connected to the steering arms 48. The rod 47 is also operatively connected to a shaft 49 extending rearwardly and connected at its rear end to the rock shaft 50. Operatively connected to the rock arm 50 to actuate the same is a second steering control element 51. The latter is rockably supported intermediate the side door openings so as to be readily accessible from a position on either of the platforms and is adapted to swing in a plane transverse to the chassis. The arrangement is such that a rocking of the lever in either direction will effect the turning of the vehicle in the direction in which it is rocked. The connection between the steering mast 51 and the steering mechanism is such as to permit readily detaching the mast, thereby rendering it possible to utilize the space between the door openings for carrying additional load. This arrangement is especially desirous when the vehicle is used on long runs where frequent stops are not necessary and it is desired to operate the vehicle from the front driving compartment.

In order to increase the adaptability of the vehicle for practically any type of deliveries and at the same time afford additional space for carrying the load I provide the sliding floor portions 52 operable when moved outwardly from the position shown in Figure 4 to close the cutaway portions above the platforms 18. Thus it will be apparent that when it is desired to operate the vehicle from the front compartment and to use all of the space in rear of the driver for carrying load, the mast 51 is merely removed and the floor portions 52 moved outwardly to close the cutaway portions of the vehicle above the platforms.

In order to provide for the escape of the air circulating through the hood 25 by the fan arranged within the hood 53, I provide louver plates 54 on opposite sides of the body, the hood 25 being suitably hinged to permit the same to be folded back for access to the engine.

What I claim as my invention is:

1. The combination with a motor driven chassis having a shiftable gear transmission, of a body supported upon the chassis, motor, gear shift and steering control means within the forward portion of the body, platforms located within the boundary of the body and depending from the chassis providing standing height clearance within the body, and auxiliary motor, gear shift and steering control means operable from a position on each platform.

2. The combination with a motor driven chassis including an internal combustion engine and a shiftable gear transmission, of a body supported upon the chassis and having door openings centrally of each side thereof, motor control, gear shift and steering means operable from within the forward portion of the body, platforms spaced below the side door openings and arranged within the boundary of the body affording a standing height clearance within the latter, auxiliary motor control and gear shift devices operable from either of said platforms, and an auxiliary steering control located within the body between the door openings and also operable from either of the platforms.

3. The combination with a vehicle having a motor driven chassis, of a platform depending from one side of the chassis, a body carried by the chassis having a width sufficient to overhang the platform and having flooring cutaway above the platform forming a standing height clearance, vehicle control devices arranged within the body for convenient actuation from a position on said platform, said control devices including a steering mast disposed substantially centrally of the body opposite the platform and mounted for rocking movement laterally of the vehicle, said steering mast being detachable, and a sliding floor section for closing the space formed by said cutaway portion of the flooring permitting the portion of the latter above the platform to be used for storing additional load.

4. The combination with a vehicle having a motor driven chassis, of platforms depending from opposite side of the chassis, a body carried by the chassis having a width sufficient to overhang the platforms and having flooring cutaway above the platforms forming a standing height clearance, the vehicle control devices arranged within the body for convenient actuation from a position on either of the platforms, said control devices including a steering mast disposed substantially centrally of the body opposite the platforms and mounted for rocking movement laterally of the vehicle, said mast being readily detachable, and sliding floor sections for closing the space formed by said cutaway portions of the flooring permitting the portions of the latter above the platforms to be used for storing additional load.

5. In a motor vehicle of the house-to-house delivery type, a chassis, front and rear ground wheels supporting said chassis, a load supporting floor carried by the chassis, a body carried by the chassis and having a width sufficient to overhang the chassis, said floor having a cut-away portion substantially within the boundaries of said body and intermediate said front and rear wheels whereby to provide a relatively low standing vehicle driving platform with standing height clearance for the operator, said floor having a portion slidably associated therewith and adapted to slide to a position above said platform whereby to provide auxiliary load supporting floor space.

6. In a motor vehicle of the house-to-house delivery type, a chassis, front and rear ground wheels supporting said chassis, a load supporting floor carried by the chassis, a body carried by the chassis and having a width sufficient to overhang the chassis, said floor having a cut-away portion substantially within the boundaries of said body and intermediate said front and rear wheels whereby to provide a relatively low standing vehicle driving platform with standing height clearance for the operator, said floor having a portion slidably associated therewith and adapted to slide to a position above said platform whereby to provide auxiliary load supporting floor space, and means for selectively controlling the operation of the vehicle from said platform or from a point forwardly therefrom.

7. In a motor vehicle of the house-to-house delivery type, a chassis, front and rear ground wheels supporting said chassis, a load supporting floor carried by the chassis, a body carried by the chassis and having a width sufficient to overhang the chassis, said floor having a cut-away portion substantially within the boundaries of said body and intermediate said front and rear wheels whereby to provide a relatively low standing vehicle driving platform with standing height clearance for the operator, said floor having a portion slidably associated therewith and adapted to slide to a position above said platform whereby to provide auxiliary load supporting floor space, and vehicle controlling means within reach of the operator when standing on said platform.

8. In a motor vehicle of the house-to-house delivery type, a chassis, front and rear ground wheels supporting said chassis, a load supporting floor carried by the chassis, a body carried by the chassis and having a width sufficient to overhang the chassis, said floor having a cut-away portion substantially within the boundaries of said body and intermediate said front and rear wheels whereby to provide a relatively low standing vehicle driving platform with standing height clearance for the operator, said floor having a portion slidably associated therewith and adapted to slide to a position above said platform whereby to provide auxiliary load supporting floor space, and vehicle controlling means within reach of the operator when standing on said platform, and a side door slidable to a position along said platform whereby to substantially enclose the operator when standing on said platform.

9. In a motor vehicle, a wheeled chassis, an internal combustion engine at the forward end thereof, a shiftable transmission lever, steering means for the vehicle, said lever and steering means being located toward the forward part of the vehicle, a low level operating platform depending from said chassis at one side of said vehicle between the front and rear wheels thereof, a body carried by said chassis having a width substantially greater than the wheel tread and enclosing said operating platform, said body providing standing height clearance from said low level platform, auxiliary steering means within said body operable from said platform, an auxiliary gear shift lever operable from said platform, and motor and brake controlling means operable from said platform.

In testimony whereof I affix my signature.

GEORGE M. BACON.